United States Patent
Sandrock et al.

(10) Patent No.: US 6,959,022 B2
(45) Date of Patent: Oct. 25, 2005

(54) MULTI-CLAD OPTICAL FIBER LASERS AND THEIR MANUFACTURE

(75) Inventors: Thomas Sandrock, Bonn (DE); Sonja Unger, Jena (DE); Alexander Harschack, Bad Honnef (DE); Volker Reichel, Jena (DE)

(73) Assignee: CeramOptec GmbH, Bonn (DE)

( * ) Notice: Subject to any disclaimer, the term of this patent is extended or adjusted under 35 U.S.C. 154(b) by 0 days.

(21) Appl. No.: 10/733,987

(22) Filed: Dec. 11, 2003

(65) Prior Publication Data

US 2004/0156401 A1    Aug. 12, 2004

Related U.S. Application Data

(60) Provisional application No. 60/442,715, filed on Jan. 27, 2003.

(51) Int. Cl.[7] .............................................. H01S 3/30
(52) U.S. Cl. .......................................... 372/6; 385/123
(58) Field of Search .................... 372/4, 5, 6; 385/146, 385/127, 123–126

(56) References Cited

U.S. PATENT DOCUMENTS

| | | | | |
|---|---|---|---|---|
| 4,087,266 | A | * | 5/1978 | Irven et al. .................... 65/377 |
| 4,265,515 | A | * | 5/1981 | Kao ............................ 385/127 |
| 4,372,648 | A | * | 2/1983 | Black ......................... 385/127 |
| 5,291,501 | A | | 3/1994 | Hanna |
| 5,533,163 | A | * | 7/1996 | Muendel ..................... 385/126 |
| 5,822,488 | A | * | 10/1998 | Terasawa et al. ........... 385/127 |
| 5,949,941 | A | | 9/1999 | DiGiovanni |
| 5,966,491 | A | | 10/1999 | DiGiovanni |
| 6,078,715 | A | * | 6/2000 | Fujii et al. ................... 385/124 |
| 6,157,763 | A | | 12/2000 | Grubb et al. |
| 6,280,850 | B1 | * | 8/2001 | Oh et al. ..................... 428/428 |
| 6,411,762 | B1 | * | 6/2002 | Anthon et al. .............. 385/123 |
| 6,434,311 | B1 | * | 8/2002 | Danziger et al. ........... 385/126 |
| 6,516,124 | B2 | * | 2/2003 | Po ............................. 385/126 |
| 6,718,106 | B2 | * | 4/2004 | Tardy et al. ................ 385/123 |

FOREIGN PATENT DOCUMENTS

| | | | |
|---|---|---|---|
| WO | WO 99/30391 | * | 6/1999 |
| WO | WO 99/30391 A1 | | 6/1999 |

* cited by examiner

*Primary Examiner*—Minsun Oh Harvey
*Assistant Examiner*—Tuan N. Nguyen
(74) *Attorney, Agent, or Firm*—BJ Associates; Bolash J. Skutnik

(57) ABSTRACT

An optical fiber is disclosed that can be used as an active medium in fiber lasers and/or fiber amplifiers, featuring a preferably rare-earth-doped silica active core surrounded by a pure or doped silica cladding layer ("pump core"). The pump core is surrounded by a doped or pure silica inner cladding for guiding pumping radiation within the pump core. Thus, the refractive index of the inner cladding is lower than that of the pump core. The fiber is surrounded by a protective coating made of polymeric material. One or more additional outer cladding layers, having refractive indexes lower than said inner cladding, may optionally be placed between the inner cladding and the protective coating to further protect the polymer coating from damage. Unlike the prior art, the protective coating does not serve as the only cladding, but is assisted by the inner cladding and optional outer cladding(s). The resultant fiber restricts radiation mainly to silica layers, thereby increasing the damage threshold and the applicable maximum pump power of the fiber.

19 Claims, 5 Drawing Sheets

FIGURE 1

PRIOR ART

MULTI-CLAD OPTICAL FIBER LASERS AND THEIR MANUFACTURE

DOMESTIC PRIORITY UNDER 35 USC 119(e)

This application claims the benefit of U.S. Provisional Application Ser. No. 60/442,715, filed Jan. 27, 2003, which is incorporated by reference herein.

BACKGROUND OF THE INVENTION

1. Field of the Invention

The present invention relates to the field of optical fibers for the generation and/or amplification and transmission of high power laser energy.

2. Information Disclosure Statement

Many applications require or benefit from the use of a high-power pump-light source. Use of a conventional laser-active single mode fiber is insufficient to launch high-power pump radiation in order to achieve high-power laser emission. There are numerous techniques available for increasing a fiber's output power, such as attempts to reduce energy density at fiber end faces through devices such as tapered fiber tips. Another common technique to overcome this obstacle is the use of appropriate so-called double-clad fibers. The use of a double-clad fiber allows coupling of pump radiation with the inner clad, which is often referred to as the pump core. The pump radiation is contained within by a polymer coating that acts both as a protective coating and as an outer clad. The pump light is coupled to the inner clad where it propagates within-the inner core and passes through the fiber core. Dopant ions (preferably rare earth (RE) ions) within the active core (i. e. the fiber core) absorb energy (i. e. pump radiation either by direct absorption or by energy transfer or by upconversion or by similar processes), which is released when pump radiation is transmitted within the core. This energy is converted to new (laser) photons that act to strengthen the laser beam and to increase its power output. The use of a higher-diameter multi mode inner clad allows for coupling with higher-power and/or lower-beam-quality pump radiation, as usually provided by high-power laser diode systems.

Unfortunately, higher order modes as they appear at large pump core diameters carry only little or even no energy at the center of the pump core where the active core is usually placed. Therefore, measures, such as an off-center placement of the active core, a non-circular pump core etc., have to be taken to improve the absorption of pump radiation within the active area.

A technique to increase the pump power that can be launched into the pump core is the so-called polarization coupling technique. Usually two pump light sources with perpendicular oriented polarization directions are coupled to the pump core. In general, this doubles the available pump power.

Further, wavelength division multiplexing is an option for improving the transmission of fibers. Two or more pump light sources with (slightly) differing wavelengths are coupled to the pump core, e. g. by dichroic beam combiners. Multiplexing allows the pump power to be increased up to a few hundred watts. However, multiplexing alone is not sufficient to increase the transmission capacity of the fiber, in that the power density in the active core can exceed about 100 $MW/cm^2$ which causes thermal loading of the fiber itself due to residual absorption of the evanescent field of the pump radiation within the polymer coating.

Figure 1:
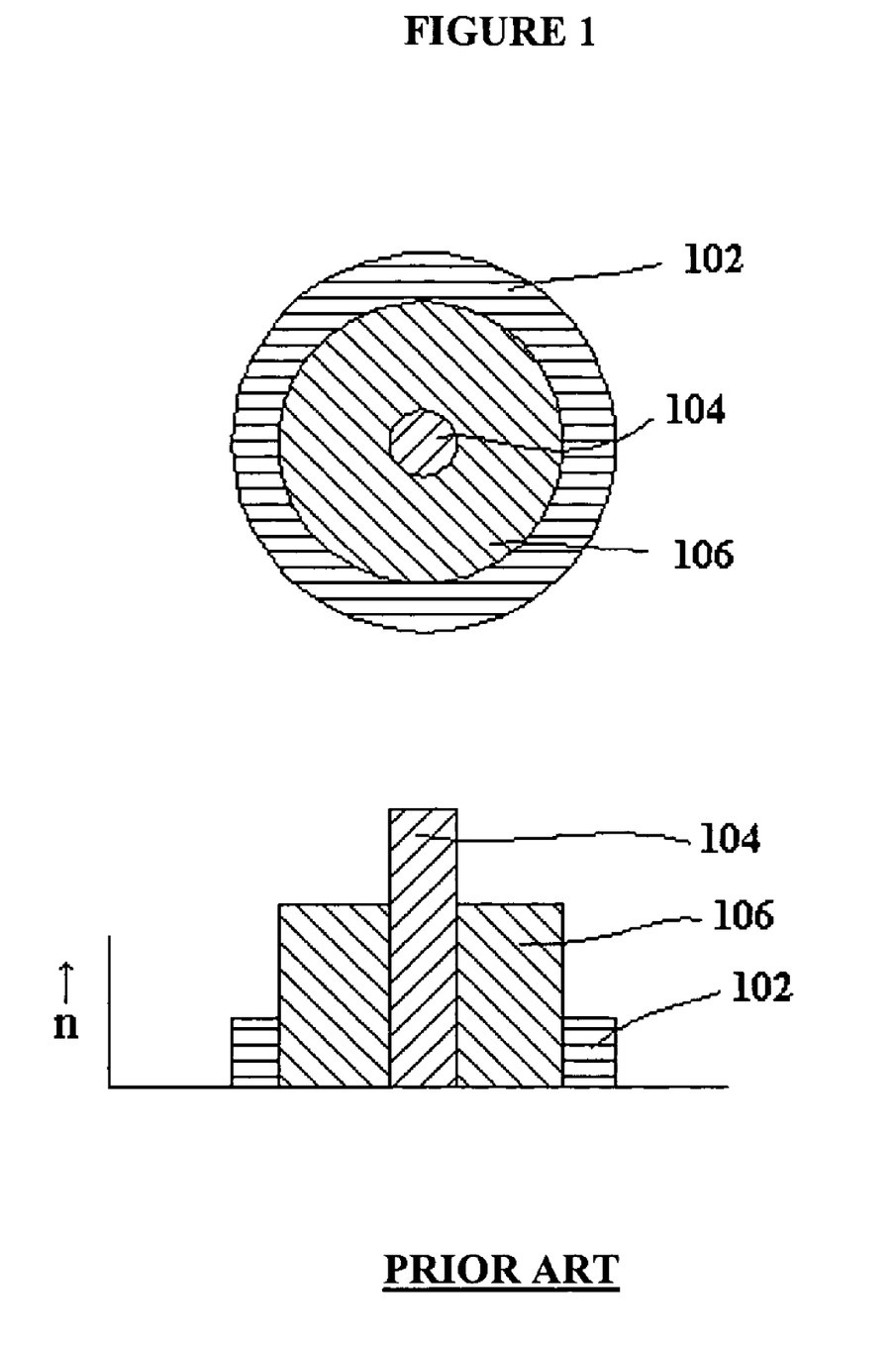
FIG. 1—Cross section of a prior art double-clad optical fiber and corresponding graphical illustration of the refractive index.

The current approach in the art to increase the output power of optical fibers using double-clad structures is illustrated in FIG. 1. In this illustration, active core 104 that has a high refractive index is surrounded by the inner clad 106 that acts as pump core. This pump core has a lower refractive index that allows for waveguiding of the laser radiation within the core 104 which is emitted by the dopant ions within said core 104. Active core 104 is made, for example, from rare earth-doped ("RE-doped") $SiO_2$, and pump core 106 is made, for example, from pure silica. Usually, the active core 104 is a single mode structure, whereas the pump core 106 is a (highly) multi-modal structure that is designed to match the beam characteristics (e. g. diameter and divergence) of the used pump laser source. The active core 104 is generally of a circular shape. It can be placed either in the center of the pump core 106 or in an off-center position which might be useful to increase the absorption efficiency. Pump core 106 is of a circular or any other cross section (e. g. rectangular, D-shaped, etc.) that might be advantageous to improve the absorption efficiency. The two-core structure is surrounded by a (protective) coating layer 102 made from a polymer such as silicone. As the refractive index difference between coating 102 and pump core 106 is responsible for guiding the pump radiation, coating 102 functions as a cladding as well as a protective layer. Therefore, the evanescent field of the pump radiation leaks into the coating 102. This is a problem because polymers' damage threshold is usually significantly lower than the damage threshold of silica. This often results in the destruction of the optically pumped double-clad fiber, especially of its end faces.

U.S. Pat. No. 6,157,763, describes a double-clad fiber designed to maximize the pumping ability of the fiber by shaping the pump cladding in a specific way and introducing stresses during the manufacturing phase to stimulate mode mixing and maximize absorbed energy in the core. Like other double-clad fibers, the fiber in this patent contains a doped core surrounded by a doped cladding with a lower index. The doped cladding is then surrounded by a cladding layer with a further lower index material. This invention envisions the use of polymers as the material of the outer cladding, which makes this invention susceptible to the kind of degradation discussed above.

U.S. Pat. No. 5,291,501 is another example of a double-clad fiber generally described in FIG. 1. This patent describes a fiber with an active core surrounded by an active inner cladding and a second outer cladding. Radiation coupled to the inner cladding causes laser emission which leaks into the monomode core, where it serves as the pump radiation for the laser active dopant in the active core.

As is described in World Patent Application WO 99/30391, double-clad fibers suffer from various problems. Double-clad fibers with concentric, radially symmetric layers have proven to be an inefficient way to amplify signals. The result of this was the creation of circular waveguides with off-center cores or non-circular pump cores. The creation of these shaped fibers resulted generally in waveguides with polymer outer claddings. Polymer claddings have a significantly lower damage threshold than silica and can be easily damaged by pump radiation.

WO 99/30391 purports to solve these problems by providing a double-clad optical fiber consisting of a glass core, an inner glass cladding layer containing an irregular outer boundary, and an outer glass cladding layer whose inner boundary conforms to the shape of the inner layer's outer boundary. A third cladding layer is optionally provided between the core and inner cladding layer to suppress high order core modes.

The outer glass cladding layer acts as both a cladding to contain the pumping radiation and an outer covering of the fiber.

U.S. Pat. No. 5,966,491 describes an optical fiber with a circular pump core, a pump cladding characterized by longitudinal troughs, a second cladding surrounding the pump cladding, and a third cladding surrounding the second cladding. In one example, the core, pump cladding, and second cladding are silica glass, and the third cladding is made of a polymer. This invention appears to be concerned with directing energy into the pump cladding and especially into the active core, rather than protecting the polymeric third cladding.

U.S. Pat. Nos. 5,949,941 and 5,966,491 describe a double-clad laser fiber comprising a rare earth-doped core, a non-circular inner cladding, a circular outer cladding, and an outer polymer layer. The outer cladding layer has an index of refraction that is lower than the inner cladding and preferably as low as possible. Generally, in the prior art according to this patent, the outer layer is used as a cladding to reflect light back into the core.

There is thus a need for multi-clad optical fibers capable of transmitting high-power laser emissions without the need for sophisticated waveguide profile shaping and without the need for claddings that are highly stable or high-strength with respect to the guided optical power. The present invention satisfies this need.

OBJECTIVES AND BRIEF SUMMARY OF THE INVENTION

It is an object of the present invention to provide an optical delivery means capable of delivering high-power radiation.

It is another object of the present invention to provide an optical fiber whose power output is greater than fibers in the prior art.

Briefly stated, the present invention discloses an optical fiber that can be used as an active medium in fiber lasers and/or fiber amplifiers, featuring a preferably rare earth-doped silica active core (also referred to as "fiber core", "active core", or "laser core") surrounded by a pure or doped silica cladding layer ("pump core"). The active core is designed to provide high-power high-brightness laser radiation. The pump core is designed to allow for launching of appropriate high-power pump light, especially emission of high-power low-brightness pump sources such as laser diodes, laser-diode bars and/or laser-diode arrays. The pump core is surrounded by a doped or pure silica inner cladding for guiding pumping radiation within the pump core. Thus, the refractive index of the inner cladding is lower than that of the pump core. The fiber is surrounded by a protective coating made of, for example, polymeric material. One or more additional outer cladding layers, having refractive indexes lower than said inner cladding, may optionally be placed between the inner cladding and the protective coating to further protect the polymer coating from damage. Unlike the prior art, the protective coating does not serve as the only cladding, but is assisted by the inner cladding and optional outer cladding(s). The resultant fiber restricts radiation mainly to silica layers, thereby increasing the damage threshold of the fiber and the applicable maximum pump power that can be launched into the fiber.

The above, and other objects, features and advantages of the present invention will become apparent from the following description read in conjunction with the accompanying drawings.

DETAILED DESCRIPTION OF PREFERRED EMBODIMENTS

The present invention provides a multiple cladding optical fiber that is capable of transmitting high optical pump powers as well as generating and/or amplifying laser emission without resulting in damage to coatings as has been experienced in the prior art. Prior art fibers generally include a high index core, usually single mode, surrounded by a silica pump core. Both the active core and pump core are surrounded by one or more coatings, usually made of polymers that are of a lower index than the pump core and serve to both protect the fiber and act as a cladding to guide waves within the pump core. However, the evanescent field (especially the evanescent field of the pump radiation) necessarily leaks into the outer coating(s), which can be destroyed during transmission of higher powers. The present invention provides a fiber with an additional glass layer between the pump core and coating, thus restricting most of the evanescent field to glass and relieving the danger of damaging the coating by high power transmission.

Double-clad fibers are known and are used to increase the transmission capacity of the fibers, but known designs still limit the applicable pump power level and thus the available output power. Numerous double-clad rare earth-doped silica fibers with a variety of compositions were tested with output powers of up to 50 watts by end-pumping. In every case, the achieved results were limited by the applicable pump power, and not by fiber parameters or coupling optics. For output powers greater than 50 watts, a significant heating of the fiber was observed. Because of attenuation of the silicone outer coating, the fiber heated to an intolerable temperature. It was discovered that the addition of a new glass layer between the pure silica pump core (inner cladding) and the silicone rubber outer coating, with an index of refraction between the index of the pump core and coating, altered the pump-power distribution to prevent damage to the outer coating.

The following terms used to describe the present invention are described herein. "Active core" refers to a glass core of an optical fiber laser or amplifier that emits laser radiation upon exposure to pump radiation or amplifies pump radiation. "Pump core" is a glass layer surrounding the active core that serves to guide pump radiation into the active core. "Inner cladding" refers to the glass layer surrounding the pump core. "Outer cladding" refers to at least one optional additional glass layer surrounding the inner cladding. "Protective coating" is a preferably polymer coating surrounding the outermost cladding layer, usually either the inner cladding or outer cladding.

The active core is designed (with respect to dopants, doping concentrations, core diameter, and refractive index) to provide high-power, high-brightness laser radiation. Also, the pump core is designed (with respect to diameter and refractive index) to allow for launching of appropriate high-power pump light, especially emission of high-power low-brightness pump sources such as laser diodes, laser-diode bars and/or laser-diode arrays. With this configuration, especially with the addition of the new glass layer, most of the pump power is guided in the central region of the pump core. The additional layer serves as a cladding around the pump core, so only a small part of the pump power is guided in that additional layer clad by the outer coating. Thus, because the absorption of radiation in the polymer coating is significantly decreased, the thermal load on the polymer layer is reduced resulting in a decrease of the temperature of the fiber and thus yielding increased stability of the fiber and improved performance of the laser/amplifier.

Another benefit of this configuration was observed, namely an increase in the pump absorption efficiency. This occurs for two reasons. First, the main part of the pump power distribution is now guided in the inner portion of the pump core according to the refractive index profile. Second, the pump power intensity loss at the boundary between the pump core and the outer coating is significantly decreased.

The primary benefit of the present invention stems from the fact that a great majority of the high-power pump radiation along with its corresponding evanescent field is now conducted in glass. Because glass has a higher damage threshold than polymers, and only a small amount of the pump power is conducted in the outer coating, the fiber is capable of conducting higher optical power before damage to the fiber is felt. Therefore, the fiber of the present invention is capable of transmitting radiation of significantly higher energies than the prior art double-clad fibers. Additionally, the pump power on the coating-clad interface is reduced, i. e. the thermal loading/strain of the coating is reduced, thus allowing higher laser efficiencies. The thermal loading is mainly due to residual absorption in the polymer coating.

Rare earth ions ("RE-ions") refer to ions of the chemical elements from the group of lanthanides, i. e. the elements from lanthanum (La, atomic number: 57) to lutetium (Lu, atomic number: 71). Rare earth doped ("RE-doped") silica refers to silica doped with ions of elements from the group of lanthanides Doping a silica glass matrix with RE-ions requires a certain solubility which can be achieved by incorporating additional dopants such as Al, Ge, B, and/or P. Incorporating one or more species of RE-ions and the respective co-dopants (Al, Ge, B, P) into silica is further referred to as rare earth-doping or RE-doping, respectively.

In the present invention, the active core with a high refractive index is surrounded by a pump core with a lower refractive index. The active core is preferably made from rare earth doped ("RE-doped") $SiO_2$, whereas the pump core is preferably made from pure silica, Ge-doped $SiO_2$ or F-doped $SiO_2$ such that the refractive index of the active core is greater than the refractive index of the pump core. This allows the pump core to act as a cladding as well as a pumping means by helping to guide radiation toward the active core. The cladding layer that surrounds this inner structure (the "inner cladding") is preferably made either from pure silica, F-doped silica or silica doped with any other suitable chemical element in such a way that its refractive index is lower than the pump core's refractive index.

The active core is designed to provide at least low mode ("near-single mode") operation, whereas single mode operation is favorable. Near-single mode cores typically can support 2–4 modes. The maximum number of modes that can typically be supported by a near-single mode core is, for example, approximately 10. Thus, one must pay attention to the choice of the relevant parameters such as core diameter and numerical aperture ("NA"). The active core's NA is calculated with respect to the refractive index difference between the active core and the pump core.

As is well known in the prior art, the active core is preferably a near-single mode (low mode) or single mode structure and the surrounding pump core layer is a multi-modal structure that is designed to match the beam characteristics, such as diameter and divergence, of the laser source used for pumping the primary beam. The active core is generally of a circular shape and can be located either in the center of the fiber or can be placed eccentrically. The pump core can be circular or can be of any suitable shape that might be advantageous to improve the absorption efficiency. Preferably, the inner cladding (or additional outer cladding or outer claddings) is of a circular shape so as to ease the process of coating the fiber with a protective polymer coating, or to ease coupling with optical radiation sources, but it may be of a similar shape as the pump core. The outer protective coating is made from a polymer material such as silicone or fluoro-acrylate. When using a Ge-doped pump core, such a refractive index difference between pump core and inner cladding can be achieved that yields higher numerical apertures of up to 0.38.

Figure 2:
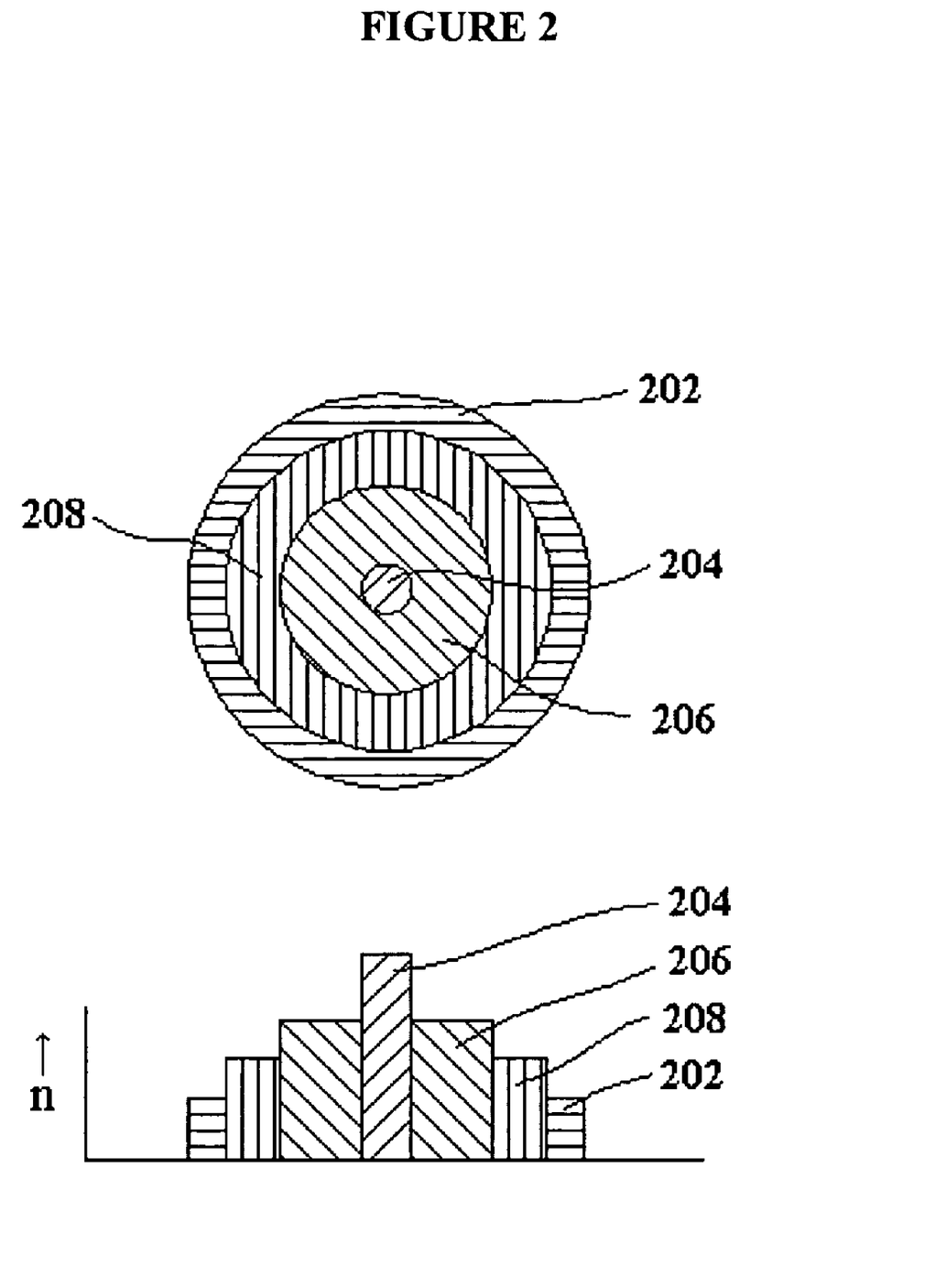
FIG. 2—Cross section of an embodiment of the present invention and graph of the refractive index.

A preferred embodiment of the present invention is illustrated in FIG. 2. Active fiber core 204 is surrounded by pump core 206, which has a lower index of refraction ("index") than active core 204. Pump core 206 is in turn surrounded by silica cladding 208, which has a lower index than pump core 206, and serves to guide pump radiation towards pump core 206 and fiber core 204 and to protect polymer coating 202. Polymer outer protective coating 202 is the outermost layer and has the lowest index.

Figure 3:
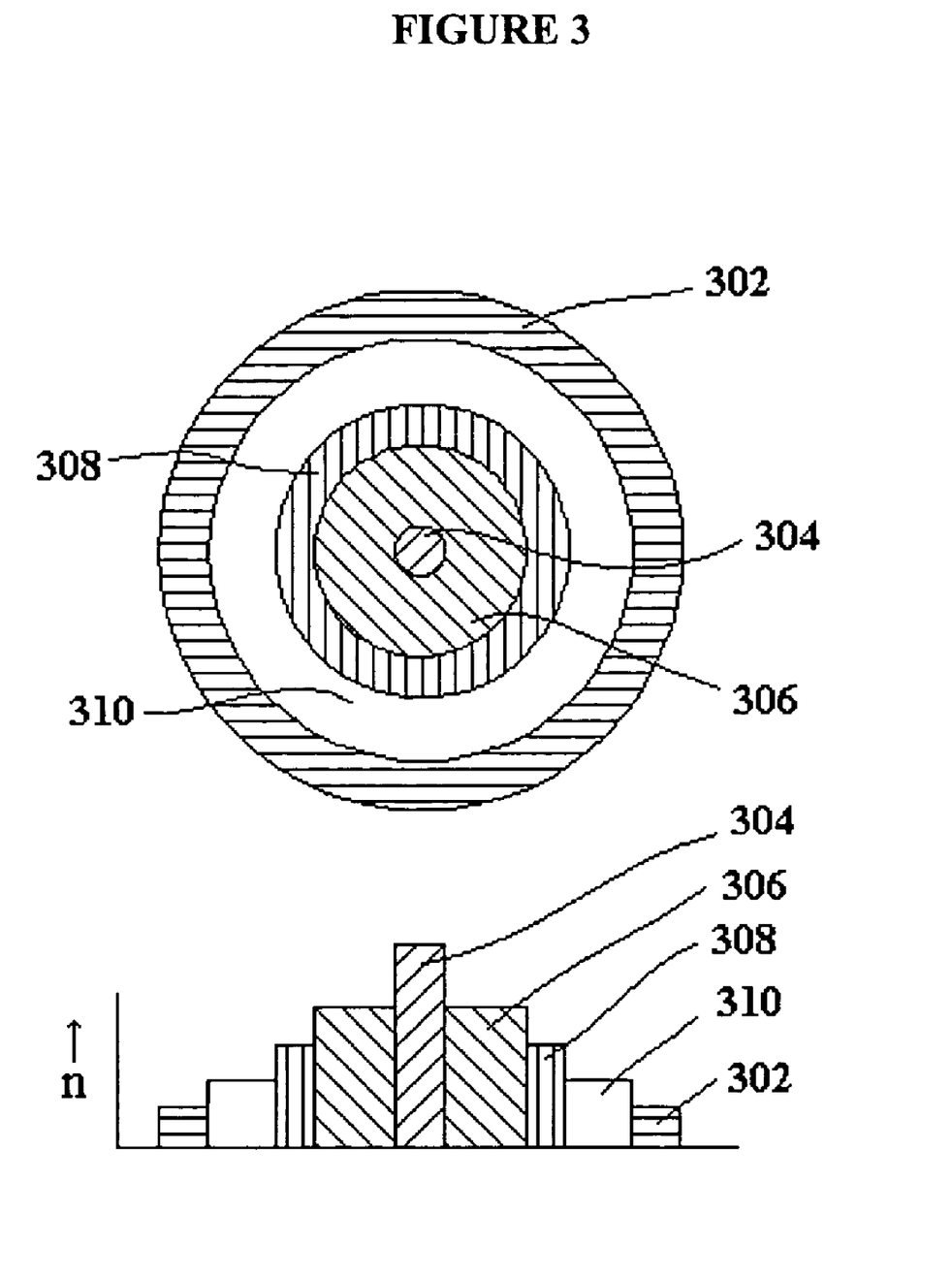
FIG. 3—Cross section of a triple-clad fiber and graph of the refractive index.

Another embodiment involves the addition of another cladding layer ("outer cladding") between cladding 208 and coating 202. FIG. 3 illustrates this embodiment. Active fiber core 304 acts to generate and/or amplify and transmit primary radiation, and is surrounded by glass (pure or doped silica) pump core 306. Pump core 306 is in turn surrounded by inner cladding 308. Unlike the previous embodiment, inner cladding 308 and coating 302 are separated by an additional outer cladding 310. This additional cladding can be useful for transmitting a second pumping beam or to further insulate protective coating 302 from damage.

In the preferred embodiment represented by FIG. 3, fiber core 304 has an index of refraction represented by $n_1$ and is preferably made of rare earth-doped silica, pump core 306 is preferably made of pure silica and has an index of $n_2$, inner cladding 308 is preferably made of fluorine-doped silica and has an index of $n_3$, and outer cladding 310 is preferably made of fluorine-doped silica and has an index of $n_4$ with $n_3 > n_4$.

In another embodiment represented by FIG. 3, fiber core 304 has an index of refraction represented by $n_1$ and is preferably made of rare earth-doped silica, pump core 306 is made of Ge-doped silica and has an index of $n_2$, inner cladding 308 is made of pure silica and has an index of $n_3$, and outer cladding 310 is preferably made of fluorine-doped silica and has an index of $n_4$.

In FIG. 3, each layer has a progressively smaller index of refraction to create total internal reflection of the primary radiation within core 304 and contain pump radiation within pump core 306. Thus $n_1$ is greater than $n_2$, $n_2$ is greater than $n_3$ and $n_3$ is greater than $n_4$.

Figure 4:
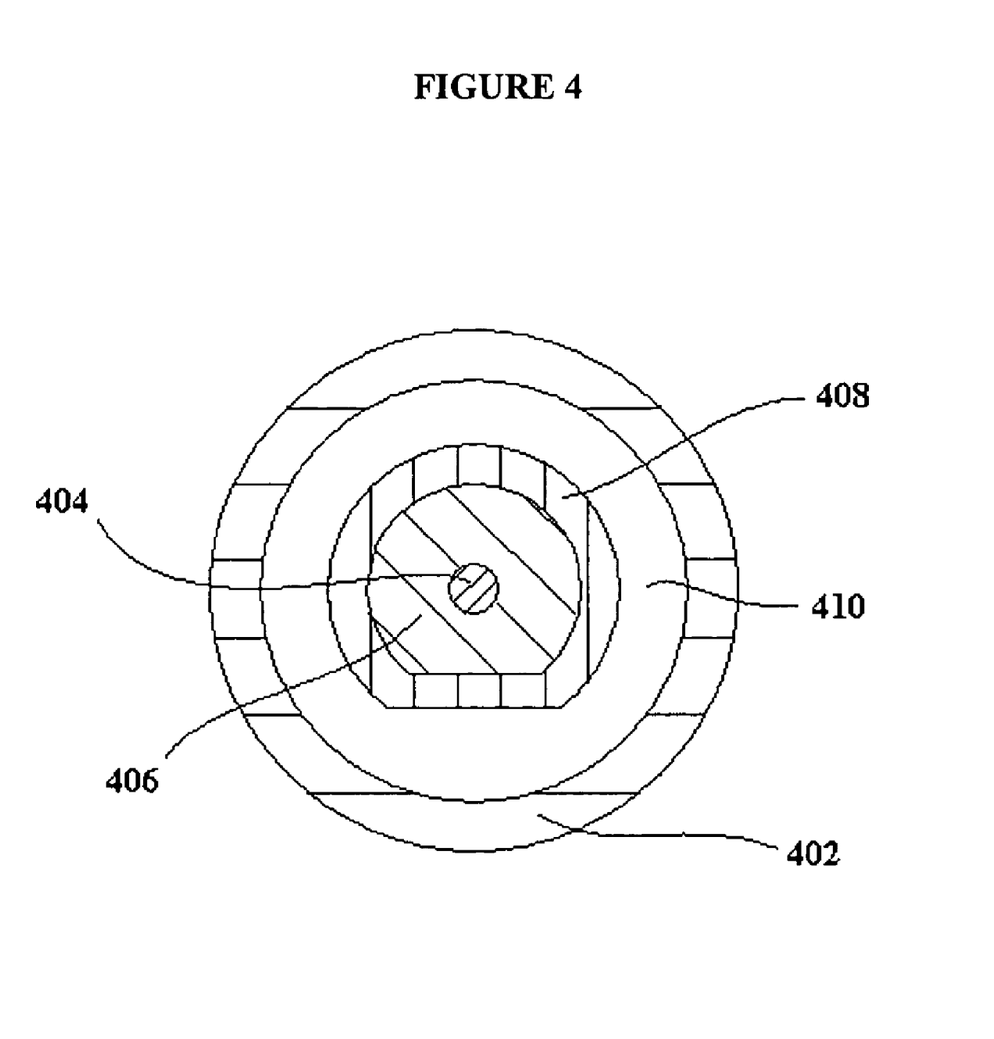
FIG. 4—Cross section of a triple-clad fiber with a D-shaped pump core and inner cladding. The refractive index profile corresponds to the one depicted in FIG. 3.

A further embodiment of the present invention features a D-shaped pump core. FIG. 4 illustrates an example of such a laser fiber. Active core 404, preferably made from rare earth doped silica, is surrounded by D-shaped pump core 406. Pump core 406 is itself surrounded by inner cladding 408, which is preferably D-shaped and is in turn surrounded by outer cladding 410. The fiber is then surrounded by polymer protective coating 402. The refractive index profile is similar to that of FIG. 3, in that the refractive index of active core 404 is the highest within the depicted embodiment, and the refractive index decreases with each successive layer.

Figure 5:
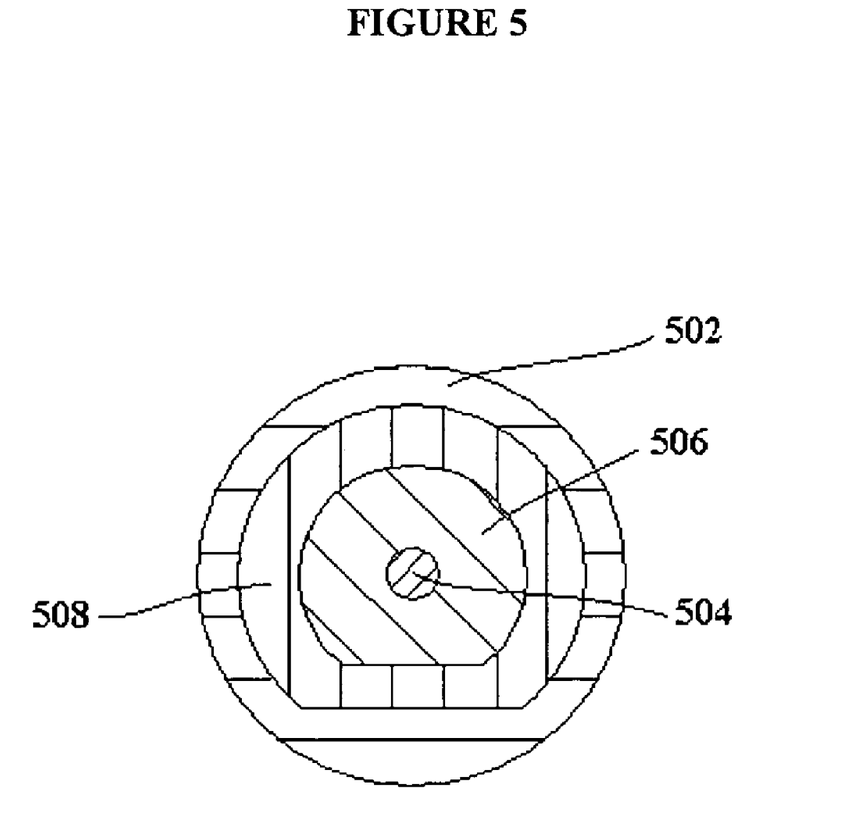
FIG. 5—Cross section of an embodiment of the present invention with a D-shaped pump core and inner cladding. The refractive index profile corresponds to the one depicted in FIG. 2.

Another embodiment featuring the D-shaped core is illustrated in FIG. 5. Active core 504, as in the above embodiment, is surrounded by D-shaped pump core 506, which is in turn surrounded by preferably D-shaped inner cladding layer 508. Polymer coating 502 is the outermost layer. The refractive index profile is similar to that of FIG. 2, in that the refractive index of active core 504 is the highest within the depicted embodiment, and the refractive index decreases with each successive layer.

Having described a D-shaped pump core as a preferred embodiment of the pump core (as described in the previous paragraphs and as depicted in FIGS. 4, 5), it is obvious that the invention is not limited to that specific geometry. Any change and modification of the pump core's cross section that yields efficient pump light absorption may be used by those skilled in the art without departing from the scope or spirit of the invention as defined in the appended claims.

The present invention also provides a process for manufacturing multi-clad fibers as described above. This manufacturing process is relatively simple to incorporate into existing manufacturing methods, because it utilizes already known manufacturing methods. The inner preform, containing the active core and the pump core (inner cladding) is made by either Modified Chemical Vapor Deposition (MCVD) or by MCVD in conjunction with the solution method or by Plasma-enhanced Chemical Vapor Deposition (PCVD). By any of these processes, the active core is deposited onto a substrate that becomes the pump core.

By MCVD in conjunction with the solution method, liquids containing Silicon and dopants are heated and vaporized in the presence of oxygen gas. Oxidizing reactions take place within the heated pump core preform tube, and the oxide compounds deposit on the interior surface of the tube in the form of soot. The silica matrix is deposited by MCVD. The rare earth doping ("RE-doping") is achieved by the solution method. The tube is then heated further to vitrify the soot, forming glass layers. Alternatively, the RE-doped core material can be deposited directly by PCVD on the inside of a $SiO_2$-tube which will become the pump core. In either case, the tube, having the active core material deposited on its inside surface, is then heated and collapsed to form a solid rod.

Additional cladding layers, forming the inner cladding and the optional outer cladding, may be deposited either by PCVD, MCVD or Outside Vapor Deposition (OVD) on the outside of the inner cladding material, i. e. on the surface of the substrate (the outer surface of the inner cladding tube preform) which might already have been collapsed to a solid preform rod. PCVD uses microwave energy to create strong electric fields that ionize precursor gas, thus forming a plasma. The plasma is formed on the surface of the substrate and provides enough heat to deposit glass layers on the substrate. The plasma is scanned back and forth along the substrate to deposit glass layers.

After the preform is completed, and regardless which preform production method is applied, the solid preform rod containing the active core, the pump core material, and the glass clad, is then drawn to the designated fiber diameter under conditions similar to those under which regular single mode fibers are drawn.

The last step is to apply a protective, preferably polymer, coating layer, which can be accomplished by a number of methods. Those methods include vapor deposition on the preform and spraying during the drawing phase of the fiber manufacture. The preform is drawn out to yield the fiber either after or during application of the protective layer.

The described preferred structures, such as is depicted in FIG. 2, require the overcoming of two major obstacles:

1. Both layers with higher and lower refractive indices than pure silica have to be deposited on a pure silica substrate, (usually a pure silica tube that generally becomes the pump core, e. g. 206)
2. In most cases, especially when the pump core's shape is non-circular, layers (e. g. the active core material) have to be deposited on the substrate's inside, where other layers (e. g. cladding material) are required on the outside of the substrate.

The ability to deposit both high refractive index layers to the inside and low refractive index layers to the outside of a pure silica tube, for example, allows for the efficient creation of high-power threshold multi-clad fiber lasers.

One advantage of the described manufacturing method is the combination of different fabrication techniques (e. g. MCVD, solution doping method, and PCVD) as different steps within the production flow. Already known methods of doping the active core with rare earth ions and doping the cladding with fluorine, for example, are used to create the desired index profile. To our knowledge, this has not been demonstrated before. Usually prior art methods are generally restricted to deposit layers either having a higher or a lower refractive index than pure silica.

Another advantage of combining different production steps is the ability to realize layers on the inside (usually the active core) of a glass substrate (usually a pure silica tube) as well as on its outside (usually the cladding(s)). Prior art methods are generally restricted to depositing layers on one deposition area, either the inside of a tube or outside of a rod.

As the commonly applied manufacturing processes lack the above-mentioned capabilities, these are the primary reasons why most double-clad fibers utilize a polymer layer as a coating which also functions as outer cladding, i. e. waveguiding of the pump light is achieved by this polymer layer.

The present invention is further illustrated by the following examples, but is not limited thereby.

EXAMPLE 1

Circular Core Fiber Laser

A multi-clad fiber laser with a circular core structure consists of a low mode (near-single mode) laser-active core with a diameter of 12 $\mu$m and NA=0.16. The pump core diameter is equal to 400 $\mu$m, NA=0.24 with respect to the glass cladding and NA=0.36 with respect to the polymer coating. The glass cladding layer, deposited by PCVD, is 20 $\mu$m thick, and is surrounded by a silicone coating.

EXAMPLE 2

D-shaped Core Fiber Laser

A multi-clad fiber laser with a D-shaped core structure has the same characteristics as Example 1. However, in this case, approximately 10% of the pump core has been removed on one side to yield the D-shape prior to applying the material of the glass clad.

EXAMPLE 3

Doping Concentrations
Yb-doping: 0.6 mol % $Yb_2O_3$, co-doping: 4 mol % $Al_2O_3$
Nd-doping: 0.1 mol % $Nd_2O_3$, co-doping: 4 mol % $Al_2O_3$

EXAMPLE 4

Performance Enhancement

Enhanced performance of the present invention includes a reduction of the fiber temperature from approx. 50° C. (without additional cladding) to approximately room temperature with the additional glass cladding, an increase of laser output power by approximately 20% with the additional cladding, and an increase of slope efficiency by approximately 15%.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A high damage threshold multi-clad optical fiber suitable for use as a high power fiber/fiber amplifier, comprising:
  a rare-earth-doped active core with index of refraction $n_1$;
  wherein said active core is selected from the group consisting of near-single mode and single mode;
  a pump core with index of refraction $n_2$, surrounding said active core;
  a glass inner cladding layer with index of refraction $n_3$, surrounding said pump core, said inner cladding preventing damage to a layer surrounding said glass inner cladding layer during high power use;
  a protective coating, surrounding said glass inner cladding layer, with an index of refraction $n_4$, and
  wherein $n_1$ is greater than $n_2$, $n_2$ is greater than $n_3$, and $n_3$ is greater than $n_4$.

2. The multi-clad optical fiber according to claim 1, wherein said active core is used to generate and/or amplify and transmit laser radiation, and wherein said pump core is used to transmit the pump radiation that is necessary to excite the laser-active ions within said active core.

3. The multi-clad optical fiber according to claim 2, wherein said glass inner cladding layer has a thickness sufficient to minimize an amount of an evanescent field of said pump radiation in said protective coating.

4. The multi-clad optical fiber according to claim 2, wherein said glass inner cladding layer has a thickness sufficient to prevent an evanescent field of said pump radiation from penetrating said protective coating.

5. The multi-clad optical fiber according to claim 1, wherein said active core further comprises additional co-dopants selected from the group consisting of Aluminum, Germanium, Boron, and Phosphorus.

6. The multi-clad optical fiber according to claim 1, wherein said pump core is made from a material selected from the group consisting of pure silica, germanium-doped silica, and fluorine-doped silica.

7. The multi-clad optical fiber according to claim 1, wherein said glass inner cladding layer is made from a material selected from the group consisting of pure silica and fluorine-doped silica.

8. The multi-clad optical fiber according to claim 1, wherein said protective coating is made from a polymer.

9. The multi-clad optical fiber according to claim 1, wherein said pump core has a non-circular cross section.

10. The multi-clad optical fiber according to claim 9, wherein said pump core is D-shaped.

11. The multi-clad optical fiber according to claim 1 wherein said glass inner cladding bayer has a non-circular cross section.

12. The multi-clad optical fiber according to claim 11, wherein said glass inner cladding layer is D-shaped.

13. The multi-clad optical fiber according to claim 1, wherein said protective coating is made from a material selected from the group consisting of silicone and fluoro-acrylate.

14. The multi-clad optical fiber according to claim 1, further comprising at least one additional glass outer cladding layer between said glass inner cladding layer and said protective coating, wherein an index of refraction of said outer cladding layer is less than $n_3$ and greater than $n_4$.

15. The multi-clad optical fiber according to claim 14, wherein said glass outer cladding layer is made from fluorine-doped silica.

16. A method for manufacturing said multi-clad optical fiber of claim 1, comprising the steps of:
  a. vaporizing a composition containing silicon and preselected rare-earth dopants;
  b. depositing said silicon and said preselected dopants on an interior of a hollow silica rod to form an interior layer of doped silica;
  c. repeating step b until a predetermined thickness of said doped silica is present;
  d. if necessary incorporating pre-selected dopants into the interior silica layer by means of the solution method;
  e. heating and collapsing said hollow silica rod to form a solid rod with said doped silica as a solid active core, with index of refraction, $n_1$ and said hollow silica rod as a pump core layer, with refractive index, $n_2$;
  f. depositing a second doped silica layer on an exterior of said solid rod by plasma-enhanced chemical vapor deposition, said layer having an index of refraction, $n_2$;
  g. heating and drawing said preform to form said optical fiber;
  h. depositing a polymer coating on an exterior of said second doped silica layer, to form a finished optical fiber; and
  i. wherein $n_1$ is greater than $n_2$, $n_2$ is greater than $n_3$, and $n_3$ is greater than $n_4$ and wherein said active core is selected from the group consisting of near-single mode and single mode.

17. The method according to claim 16, wherein interior deposition step b is accomplished by a method selected from the group consisting of Modified Chemical Vapor Deposition (MCVD), MCVD in conjunction with the solution method, and Plasma-enhanced Chemical Vapor Deposition (PCVD).

18. The method according to claim 16, wherein exterior deposition step f is accomplished by a method selected from the group consisting of Modified Chemical Vapor Deposition (MCVD), Plasma-enhanced Chemical Vapor Deposition (PCVD), and Outside Vapor Deposition (OVD).

19. The multi-clad optical fiber according to claim 1, further including one or more glass cladding layers between said pump core and said inner cladding layer.

* * * * *